United States Patent
White et al.

(10) Patent No.: US 6,673,303 B2
(45) Date of Patent: Jan. 6, 2004

(54) BOTTLE AND CLOSURE

(75) Inventors: Charles Raymond White, Parsippany, NJ (US); David Ziegenhorn, Grayslake, IL (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 10/248,008

(22) Filed: Dec. 10, 2002

(65) Prior Publication Data
US 2003/0106874 A1 Jun. 12, 2003

Related U.S. Application Data

(63) Continuation of application No. 09/783,830, filed on Feb. 15, 2001, now Pat. No. 6,536,617.

(51) Int. Cl.$^7$ .......................... B29C 49/06; B29C 49/08
(52) U.S. Cl. ..................... 264/524; 264/532; 264/537
(58) Field of Search ................................ 264/524, 537, 264/532

(56) References Cited

U.S. PATENT DOCUMENTS

| | | | |
|---|---|---|---|
| 4,665,682 A | * 5/1987 | Kerins et al. .................. 53/452 |
| 5,143,235 A | 9/1992 | Repp ........................... 215/256 |
| 5,261,567 A | 11/1993 | Krall ........................... 222/153 |
| 6,079,579 A | 6/2000 | De Cuyper ................... 215/41 |
| 6,228,317 B1 | * 5/2001 | Smith et al. ................. 264/521 |

FOREIGN PATENT DOCUMENTS

GB 2131344 A 6/1984

* cited by examiner

Primary Examiner—Suzanne E. McDowell
(74) Attorney, Agent, or Firm—Michael J. McGreal

(57) ABSTRACT

There are various ways to latch a closure onto a container. It has been found that for blowmolded containers that the support flange for the bottle preform can later be used as a part of the latch mechanism to secure a closure onto the container. Preforms have a support flange by which the preform is handled prior to being placed into the mold and in the mold. Prior to being placed in the mold, the preform is heated to about 85° C. to about 200° C. During this time and in the mold, it will be supported by the support flange. This support flange is used after the container is blown and filled as one part of the latching mechanism of the closure. The closure will have a portion that is an interference fit with the support flange of the bottle to thereby secure the closure to the bottle.

10 Claims, 4 Drawing Sheets

BOTTLE AND CLOSURE

This application is a continuation of U.S. application Ser. No. 09/783,830 filed Feb. 15, 2001, now U.S. Pat. No. 6,536,617.

BACKGROUND OF INVENTION

1. Field of the Invention

This invention relates to a technique for attaching a closure to a blowmolded bottle. More particularly, this invention relates to the use of the holding ring of the bottle preform as the attachment means for the closure.

2. Background of the Invention

There are many ways to attach a closure to a bottle. There are built in various mechanisms to latch the closure onto a bottle. The latching usually is onto the neck of the bottle. The neck is the portion above the bottle shoulder and includes the spout portion that channels the contents of the bottle into a narrowed area for dispensing from the bottle. The neck of the bottle will have threads or other attachment means for the securing of the closure onto the bottle.

It has been found that for blowmolded bottles that the ledge on the neck that is used to support the preform being handled during heating, and transport to the blowmold and in the blowmold can be used to attach and secure a closure to the blown bottle. This ledge usually is a continuous support flange that surrounds the neck of the bottle. However, it can be a discontinuous support flange in a plurality of segments. In this way, this flange that is used in the blowmolding of the bottle from the preform is subsequently also used to secure a closure to the blown bottle. A closure will have a continuous or discontinuous projecting ledge on a structure depending from the closure to provide an interference fit with the support flange on the neck of the bottle. This interference fit secures the closure to the bottle.

SUMMARY OF INVENTION

This invention is directed to the use of the support flange on the neck of a bottle that supports the bottle preform also to be used as a part of the mechanism to secure a closure onto the bottle. That is, the support flange on the neck of a bottle preform and subsequently on the neck of a bottle is used to support the bottle during blowmolding and to secure a closure onto the bottle.

The preform from which a bottle is to be blowmolded must be handled and placed in a mold. The preform is heated to a temperature of about 85° C. to about 200° C. for blowmolding depending on the material. During this time, the preform will be supported by a flange on the neck of the preform, and which eventually will be on the neck of the bottle. This support flange can be continuous or discontinuous, it only need be of a structure to support the preform prior to being placed into the mold and to be supported in the mold.

The closure will have a latching mechanism to latch onto the flange on the bottle neck which was the support flange of bottle preform. This latching mechanism can depend from the top wall or from the sidewall of the closure. Usually, it will depend from the top wall and coordinate with the seal for the bottle. This will be one or more depending latching sections that will provide an interference fit with the support flange of the bottle.

The seal will depend from the top wall and will in most instances be the friction fit of a mating section into the bottle spout. This can be on the inner or outer surface of the bottle spout, and usually will be on the inner surface.

DETAILED DESCRIPTION

Figure 1:
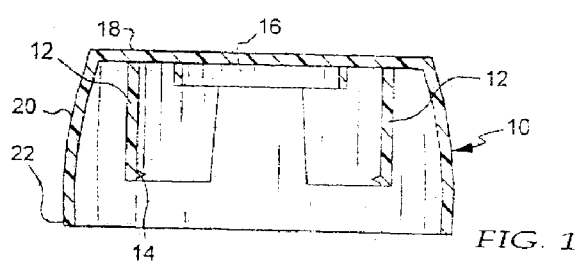
FIG. 1 is a cross-sectional view of the closure for the bottle.

The invention will be described in more detail with reference to the drawings. FIG. 1 shows the closure, FIG. 2 the container and FIG. 3 the closure on the container. FIG. 4 is an elevational view of the preform from which the bottle is made.

The closure 10 in FIG. 1 is comprised of a top wall 18 and sidewall 20. Depending from the top wall is sealing ring 16 and attachment prongs 12. These attachment prongs have latch 14 at a lower end to engage a flange on the neck finish of a container. The prongs 12 are flexible so that they can fit down over the neck finish flange and secure the closure to the neck finish. The seal ring 16 fits into the container spout opening, and in close contact with the inner surface of the container spout opening, seals the container openings.

Figure 2:
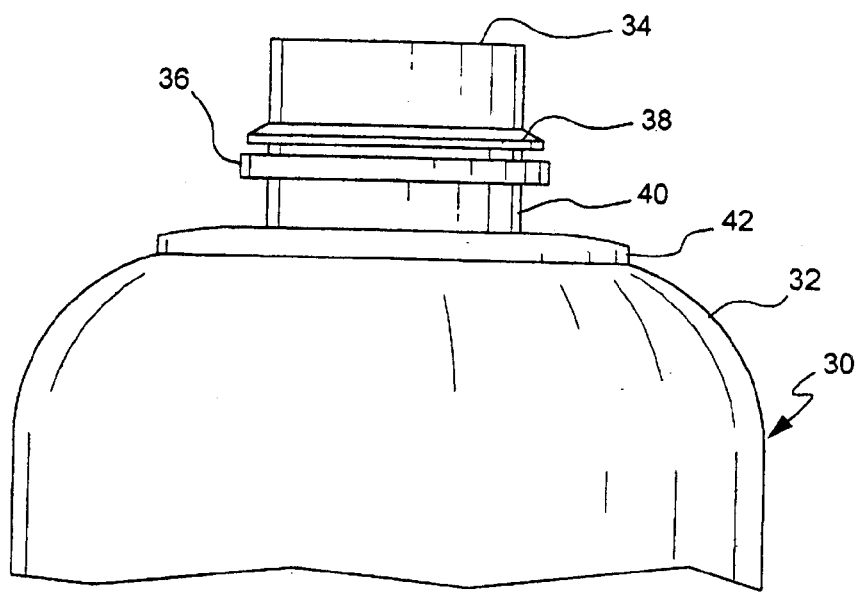
FIG. 2 is elevational view of the top portion of a bottle with a support flange.

In FIG. 2, the container 30 is shown with neck 40 and container dispensing spout opening 34. Mounted on the neck 40 are flanges 38 and 40. Flange 36 is a preform support flange and flange 38 is a guide flange to guide prongs 12 over preform support flange 36. Guide flange is shown as being beveled but this is not required. This preform support flange also is a latching flange. Ridge 42 on the upper surface of shoulder 32 serves as a circumferential support for the closure when it is in sealing engagement on the container.

Figure 3:
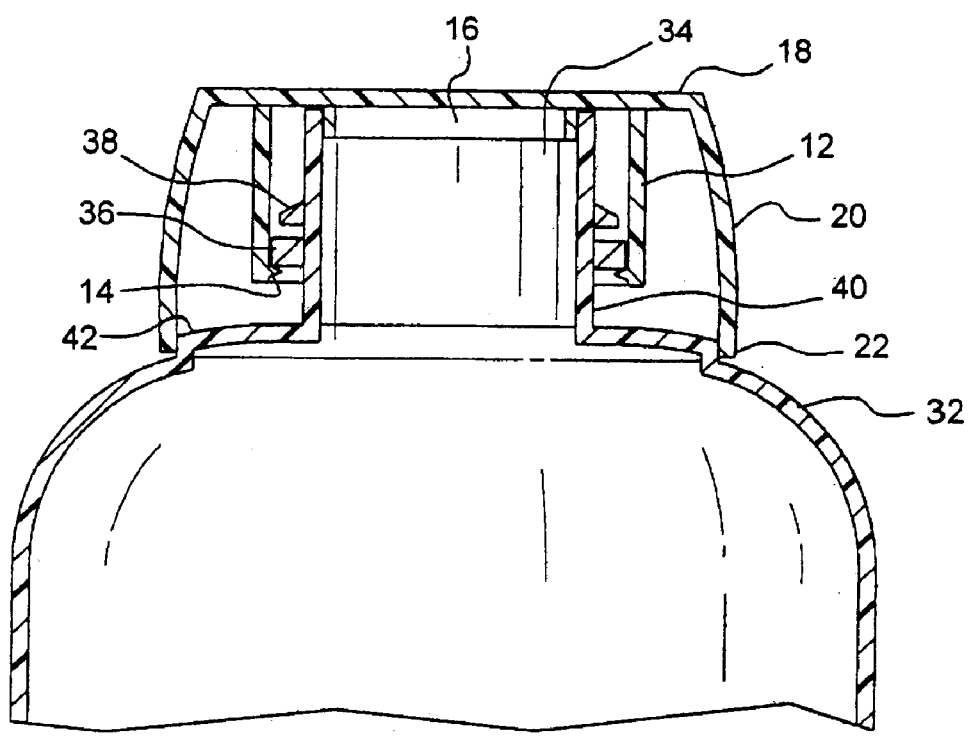
FIG. 3 is cross-sectional view of the bottle and closure of FIGS. 1 and 2.
Figure 4:
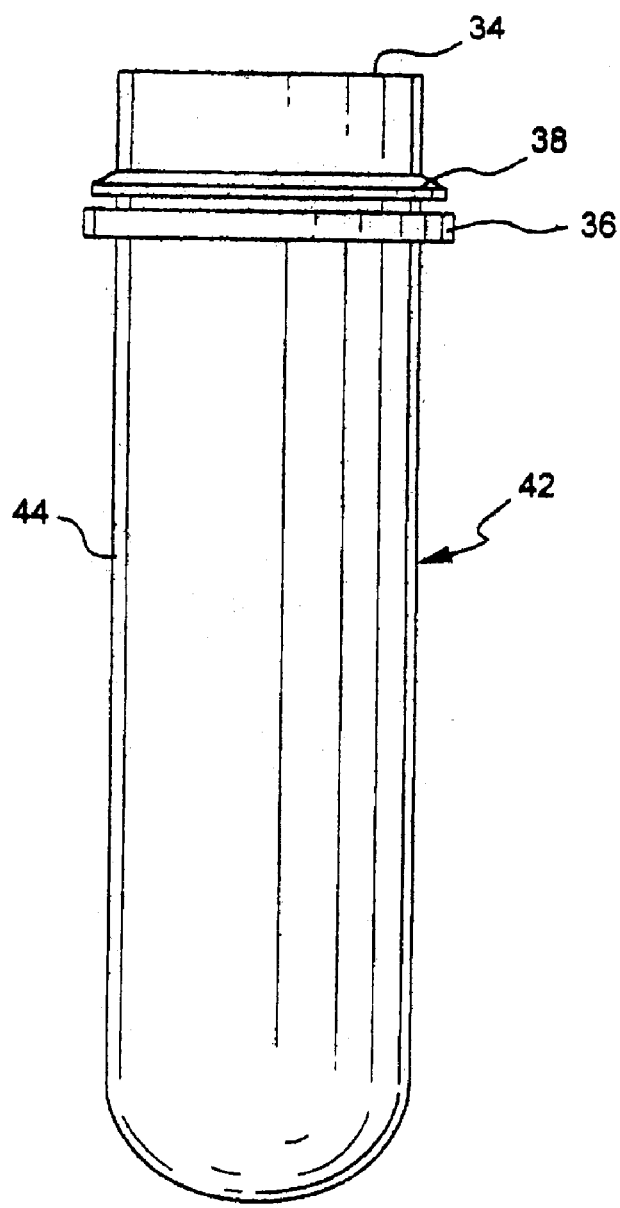
FIG. 4 is a elevational view of the preform that is used to produce the bottle of FIG. 2.

FIG. 3 shows the closure 10 in place on container 30. Seal ring 16 fits into dispensing opening 34 in a sealing fit. Latches 14 on prongs 12 are shown fitted under preform support ring 36. This latching maintains the closure on the container neck finish 40. Ridge 42 of the container is shown supporting the lower edge 22 of the closure.

The closure will have a dispensing opening on the upper surface. This can be a hinged pin valve closure on top surface 18 with arm opening 24 extending through the top wall within seal ring 16. This also can be a snap valve closure having an open and closed position or a flexible membrane valve closure. Essentially, any valve type of closure can be used in the top surface.

FIG. 4 shows the preform 42 from which the container 30 is blowmolded. The preform is injection molded with the upper portion having the same structure as the blowmolded container and the lower part 44 having a thickened wall and which will be blowmolded to the final shape of the container. The container can be blowmolded or injection stretch blowmolded. If the plastic is polyethylene terephthalate, it will be injection stretch blowmolded.

The container can be made from any plastic that can be blowmolded. This includes the polyolefins, polyethylene and polypropylene and the polyesters such as polyethylene terephthalate and polyethylene naphthalate. The cap will be a polyolefin plastic such as polyethylene or polypropylene.

A prime feature of this container and closure is the use of the preform flange as both the preform support flange and the flange for attachment of a closure.

What is claimed is:

1. A method of making a container with a closure comprising:

provide a preform of said container, said preform having a support flange to support said preform during at least a part of the process of blowmolding said preform to said container;

blowmolding said preform within a mold to the shape of said container, said preform being supported by said support flange;

removing said container from the mold;

providing a closure for said container, said closure having a top wall and a depending sidewall, further depending from said top wall and within said sidewall are a plurality of prongs with at least one latch projection on a lower end thereof to engage said support flange of said container and thereby retain said closure on said container; and attaching said closure to said container by said at least one latch projection engaging said support flange.

2. The method of claim 1 wherein there is a seal ring depending from said top wall, said sea ring fitting into an opening at a top part of said container to seal said container.

3. The method of claim 2 wherein said seal ring is surrounded by said prongs.

4. The method of claim 1 wherein said projections extend inward toward said support flange.

5. The method of claim 1 wherein said preform and container have a guide flange on said container neck, said guide flange located between said support flange and an upper most end of said container neck.

6. The method of claim 5 wherein said guide flange is located adjacent said support flange.

7. The method of claim 1 wherein an upper end of said container body has a support ridge to support a lower edge of said closure sidewall.

8. The method of claim 1 wherein said preform and said container are comprised of polyethylene.

9. The method of claim 1 wherein said preform and said container re comprised of polypropylene.

10. The method of claim 1 wherein said preform and said container are comprised of polyethylene terephthalate.

* * * * *